United States Patent
Navarro et al.

(10) Patent No.: US 12,437,243 B2
(45) Date of Patent: Oct. 7, 2025

(54) SYSTEM AND METHOD FOR PROVIDING LOCATION-BASED APPOINTMENT OPERATIONS

(71) Applicant: The Toronto-Dominion Bank, Toronto (CA)

(72) Inventors: Miguel Navarro, Ewing, NJ (US); Levi Sutter, Westampton, NJ (US); Aparicio Giddins, Jr., Mullica Hill, NJ (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/518,237

(22) Filed: Nov. 22, 2023

(65) Prior Publication Data

US 2024/0086786 A1    Mar. 14, 2024

Related U.S. Application Data

(63) Continuation of application No. 16/257,788, filed on Jan. 25, 2019, now Pat. No. 11,868,924.

(51) Int. Cl.
*G06Q 10/02*    (2012.01)
*G06K 7/14*    (2006.01)
(Continued)

(52) U.S. Cl.
CPC ............ *G06Q 10/02* (2013.01); *G06K 7/1417* (2013.01); *H04M 1/72451* (2021.01); *H04W 4/021* (2013.01)

(58) Field of Classification Search
CPC .. G06Q 10/02; G06F 7/1417; H04M 1/72451; H04M 1/72457; H04M 1/2755; H04M 2250/52; H04W 4/021
(Continued)

(56) References Cited

U.S. PATENT DOCUMENTS 7,376,511 B2    5/2008    Szabo et al.
7,487,112 B2    2/2009    Barnes, Jr.
(Continued)

FOREIGN PATENT DOCUMENTS

IN    1467CHE2004    7/2013
JP    2017016204    1/2017

OTHER PUBLICATIONS

Context-Aware Recommendations in the Mobile Tourist Application Compass, van Setten et al (Year: 2004).*
(Continued)

*Primary Examiner* — Michael P Harrington
*Assistant Examiner* — Mark C Clare
(74) *Attorney, Agent, or Firm* — Rowand LLP; Peter Eschlboeck

(57) ABSTRACT

A computer-implemented method for providing location-based appointment operations is disclosed. The method includes receiving input indicating an instruction to perform an action related to appointments. Responsive to the input indicating the instruction to perform the action related to appointments, image recognition techniques may be used to determine that a computing device is proximate to a physical location where locations are schedulable. Then, responsive to determining that the computing device is proximate to the physical location, information related to scheduling appointments at the physical location is received via a network. The indication based on the received information is presented at the computing device. Input requesting an action in relation to an appointment at the physical location may be received at the computing device. An indication to initiate the requested action may be sent via the network. Related computing devices and computer-readable media are also disclosed.

20 Claims, 12 Drawing Sheets

(51) Int. Cl.
*H04M 1/72451* (2021.01)
*H04W 4/021* (2018.01)

(58) Field of Classification Search
USPC .......................................................... 705/5
See application file for complete search history.

(56) References Cited

U.S. PATENT DOCUMENTS

| | | |
|---|---|---|
| 7,870,022 B2 | 1/2011 | Bous et al. |
| 8,521,680 B2 | 8/2013 | Lin |
| 8,532,713 B2 | 9/2013 | Rao |
| 9,230,260 B2 | 1/2016 | Williams et al. |
| 9,384,500 B2 | 7/2016 | Ramer et al. |
| 9,874,453 B2 | 1/2018 | Saraswat |
| 2006/0064346 A1 | 3/2006 | Steenstra et al. |
| 2010/0332324 A1 | 12/2010 | Khosravy et al. |
| 2012/0278165 A1 | 11/2012 | Mercuri et al. |
| 2014/0257883 A1 | 9/2014 | Thompson |
| 2014/0344420 A1* | 11/2014 | Rjeili ............... G06Q 10/109 709/227 |
| 2015/0039357 A1* | 2/2015 | Segal ............. G06Q 10/06314 705/5 |
| 2016/0004981 A1 | 1/2016 | Wang |
| 2016/0092944 A1 | 3/2016 | Taylor et al. |
| 2016/0117730 A1 | 4/2016 | Nats et al. |
| 2016/0171891 A1* | 6/2016 | Banatwala ............. G08G 1/144 340/932.2 |
| 2016/0247388 A1 | 8/2016 | Sogabe |
| 2017/0357917 A1* | 12/2017 | Holmes ............... G06Q 10/109 |
| 2018/0012317 A1 | 1/2018 | Huang |
| 2019/0012614 A1* | 1/2019 | Yamada ........... G06Q 10/06314 |

OTHER PUBLICATIONS

Goh, Dion H; Ang, Rebecca P; Lee, Chei Sian; Lee, Chu Keong, Determining Services For The Mobile Tourist, The Journal of Computer Information Systems; Stillwater vol. 51, Iss. 1, (Fall 2010): 31-40, Published online: Dec. 11, 2015.

Fei Yu et al., Point-of-Interest Recommendation for Location Promotion in Location-Based Social Networks, "Published in: 2017 18th IEEE International Conference on Mobile Data Management (MDM), Date of Conference: May 29-Jun. 1, 2017", https://ieeexplore.ieee.org/document/7962475. DOI: 10.1109/MDM.2017.57.

CN Industrial Design registration No. CN303932180 S, registered Nov. 23, 2016.

Van Setten et al; "Context-Aware Recommendations in the Mobile Tourist Application Compass", (2004) (Year: 2004).

* cited by examiner

SYSTEM AND METHOD FOR PROVIDING LOCATION-BASED APPOINTMENT OPERATIONS

CROSS-REFERENCE TO RELATED APPLICATIONS

The present application is a continuation of U.S. patent application Ser. No. 16/257,788 entitled "SYSTEM AND METHOD FOR PROVIDING LOCATION-BASED APPOINTMENT OPERATIONS", filed Jan. 25, 2019, the contents of which are hereby incorporated by reference.

TECHNICAL FIELD

The present application relates to location-dependent computing, and, more particularly, to providing location-based appointment operations.

BACKGROUND

Some services are provided on an appointment basis. Individuals wishing to make appointments while visiting such a location generally interact with a receptionist in order to schedule an appointment. Similarly, when they arrive at a location for an appointment, they will generally check-in with a human like the above-mentioned receptionist.

Additionally or alternatively, in some locations there may not be a dedicated person (such as, for example, the above-mentioned dedicated receptionist) to check-in with, and it may be necessary to check-in with an ordinary customer service person. In a particular example, where the location is a bank, a customer with an appointment could have to queue to check-in for their appointment with a teller. Notably, this may represent an unnecessary delay in providing service and/or an unnecessary use of the time of a trained teller.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
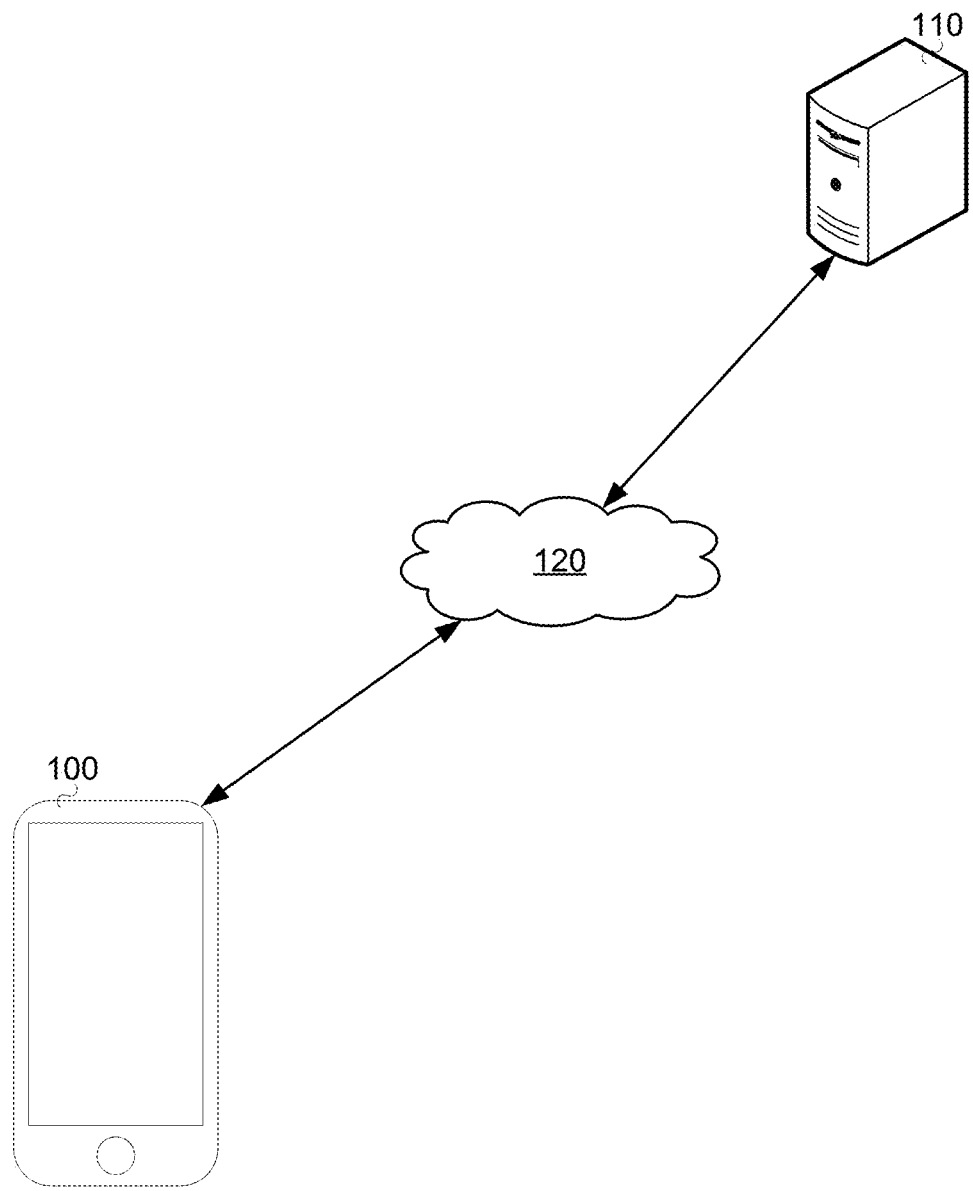
FIG. 1 is a schematic operation diagram illustrating an operating environment of an example embodiment.

According to the subject matter of the present application, there may be provided a computing device. The computing device may include a processor, an input module, an output module, a communications module and a memory. The input module, the output module, the communications module and the memory may be coupled to the processor. The memory may store instructions that, when executed by the processor, cause the computing device to receive input indicating an instruction to perform an action related to appointments. The memory may further store instructions that, when executed by the processor, cause the computing device to, responsive to the input indicating the instruction to perform the action related to appointments, determine that the computing device is proximate to a physical location where appointments are schedulable. The memory may further store instructions that, when executed by the processor, cause the computing device to, responsive to determining that the computing device is proximate to the physical location: receive, using the communications module, information related to scheduling appointments at the physical location; present, via the output module, an indication based on the received information; receive, via the input module, input requesting an action in relation to an appointment at the physical location; and send, using the communications module, an indication to initiate the requested action.

In this way, appointment-related actions such as, for example, scheduling, canceling, or checking in for an appointment may be performed without the need for a person such as, for example, human receptionist. Further, in situations where a customer would otherwise have to wait to check-in for their appointment with an ordinary customer service person such as, for example, with a teller in the case of a bank without a dedicated receptionist, service may be sped-up and/or resources may be saved. For example, the customer may be able to check-in more quickly. Additionally or alternatively, workload of customer service persons such as, in the case of the bank example, tellers, may be eased by removing people checking for appointments from their workload (e.g., from the teller queue), thereby allowing other customers to be seen more quickly. Furthermore, such automation may allow additional appointment-related features and functionality to be provided as further described below including, potentially, features and/or functionality that could not be provided in a manual system.

In some implementations, the computing device may further include a location module coupled to the processor. It may be that determining that the computing device is proximate to the physical location includes determining a location of the computing device using the location module.

In some implementations, the computing device may further include an image capture module coupled to the processor. It may be that determining that the computing device is proximate to the physical location includes: capturing, using the image capture module, an image of a portion of an environment in which the computing device is located; and detecting that the captured image includes a particular physical object expected in the physical location. Further, it may be that the instructions, when executed by the processor, further cause the computing device to: present, via the output module, the captured image with the particular physical object replaced by a user interface including the indication based on the received information.

In some implementations, it may be that the information related to scheduling appointments at the physical location includes information related to available appointments at the physical location. In some such implementations, the requested action may include a request to book one of the available appointments.

In some implementations, it may be that instructions, when executed by the processor, further cause the computing device to: receive an indication that a prior appointment associated with the computing device was previously scheduled for the physical location; detect that a current time falls within an interval encompassing a start time of the prior appointment; and present an option to check-in for the prior appointment. It may be that the input requesting the action includes input selecting the option to check-in for the prior appointment and wherein an indication to check-in for the prior appointment is sent responsive to receiving the input.

In some implementations, the received information may further include one or more promotions identified based on a profile associated with the computing device.

According to the subject matter of the present application, there may be provided a computer-implemented method. The method may include receiving input indicating an instruction to perform an action related to appointments; and responsive to the input indicating the instruction to perform the action related to appointments, determining that a computing device is proximate to a physical location where locations are schedulable. The method may further include, responsive to determining that the computing device is proximate to the physical location: receiving, via a network, information related to scheduling appointments at the physical location; presenting, at the computing device, an indication based on the received information; receiving, at the computing device, input requesting an action in relation to an appointment at the physical location; and sending, via the network, an indication to initiate the requested action.

In some implementations, determining that the computing device is proximate to the physical location may include determining a location of the computing device using a location module.

In some implementations, determining that the computing device is proximate to the physical location may include: capturing, using an image capture module, an image of a portion of an environment in which the computing device is located; and detecting that the captured image includes a particular physical object expected in the physical location. It may be that the method further includes presenting the captured image with the particular physical object replaced by a user interface including the indication based on the received information.

In some implementations, the information related to scheduling appointments at the physical location may include information related to available appointments at the physical location. In some such implementations, the requested action may include a request to book one of the available appointments.

In some implementations, the method may further include receiving an indication that a prior appointment associated with the computing device was previously scheduled for the physical location; detecting that a current time falls within an interval encompassing a start time of the prior appointment; and presenting an option to check-in for the prior appointment. It may be that the input requesting the action includes input selecting the option to check-in for the prior appointment and that an indication to check-in for the prior appointment is sent responsive to receiving the input.

In some implementations, the received information may further include one or more promotions identified based on a profile associated with the computing device.

According to the subject matter of the present application, there may be provided a non-transitory computer-readable storage medium storing instructions. When executed by a processor of a computing device, the instructions may cause the computing device to: receive input indicating an instruction to perform an action related to appointments; and responsive to the input indicating the instruction to perform the action related to appointments, determine that the computing device is proximate to a physical location where appointments are schedulable. When executed by a processor of a computing device, the instructions may further cause the computing device to, responsive to determining that the computing device is proximate to the physical location: receive information related to scheduling appointments at the physical location; present an indication based on the received information; receive input requesting an action in relation to an appointment at the physical location; and send an indication to initiate the requested action.

In some implementations, the instructions, when executed by the processor, may further cause the computing device to: capture an image of a portion of an environment in which the computing device is located; and detect that the captured image includes a particular physical object expected in the physical location. Additionally, it may be that the instructions, when executed by the processor, further cause the computing device to: present the captured image with the particular physical object replaced by a user interface including the indication based on the received information.

In some implementations, the instructions, when executed by the processor, may further cause the computing device to: receive an indication that a prior appointment associated with the computing device was previously scheduled for the physical location; detect that a current time falls within an interval encompassing a start time of the prior appointment; and present an option to check-in for the prior appointment, wherein the input requesting the action includes input selecting the option to check-in for the prior appointment and wherein an indication to check-in for the prior appointment is sent responsive to receiving the input.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a mobile computing device 100 and a computer server system 110 communicate via a network 120.

The mobile computing device 100 and the computer server system 110 may be in geographically disparate locations. Put differently, the mobile computing device 100 may be remote from the computer server system 110 and vice-versa.

The mobile computing device 100 and the computer server system 110 are both computer systems and computing devices.

As further described below, the mobile computing device 100 and the computer server system 110 co-operate to provide location-based appointment operations based on a location of the mobile computing device 100.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

As further explained below, the mobile computing device 100 co-operates with the computer server system 110 via the network 120 to receive information related to scheduling appointments at physical locations and to initiate related actions.

Figure 2B:
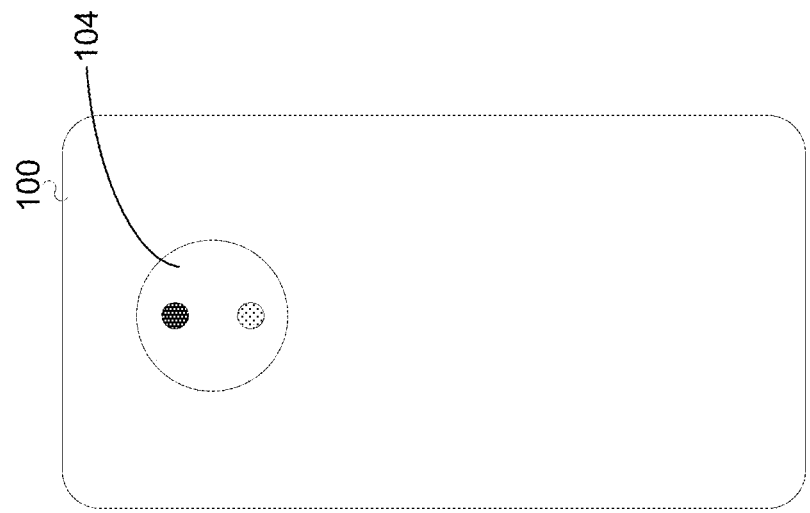
FIGS. 2A and 2B show the front and back of a mobile device, respectively.
Figure 2A:
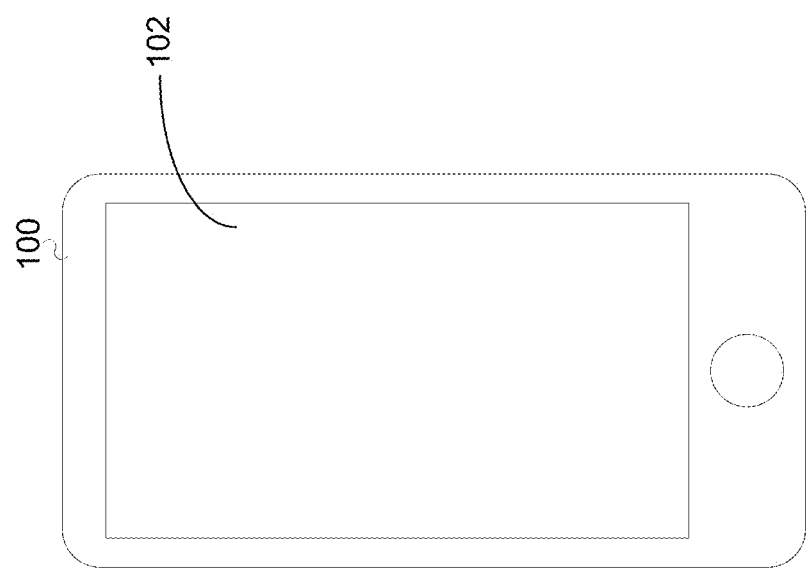

FIGS. 2A and 2B show the front and back of the mobile computing device 100, respectively. The mobile computing device 100 may, in some embodiments, be a smartphone as shown in FIGS. 2A and 2B. In other embodiments, the mobile computing device 100 may be another form of mobile computing device such as, for example, a tablet.

Referring now to FIG. 2A, the front of the mobile computing device 100 includes a display 102. The display 102 is a module of the mobile computing device 100. The display 102 is for presenting graphics. The display 102 may be, for example, a liquid crystal display (LCD). In addition to being an output device, the display 102 may also be an input device. For example, the display 102 may allow touch input to be provided to the mobile computing device 100. In other words, the display 102 may be a touch sensitive display module. In a particular example, the display 102 may be a capacitive touch screen.

Referring to FIG. 2B, the rear of the mobile computing device 100 includes a camera 104. The camera 104 is an image capture module. The camera 104 is for capturing images of the environment of the mobile computing device 100. The camera 104 may incorporate a digital image sensor such as, for example, a charge coupled device (CCD) or a complementary metal-oxide-semiconductor (CMOS) image sensor.

Figure 3:
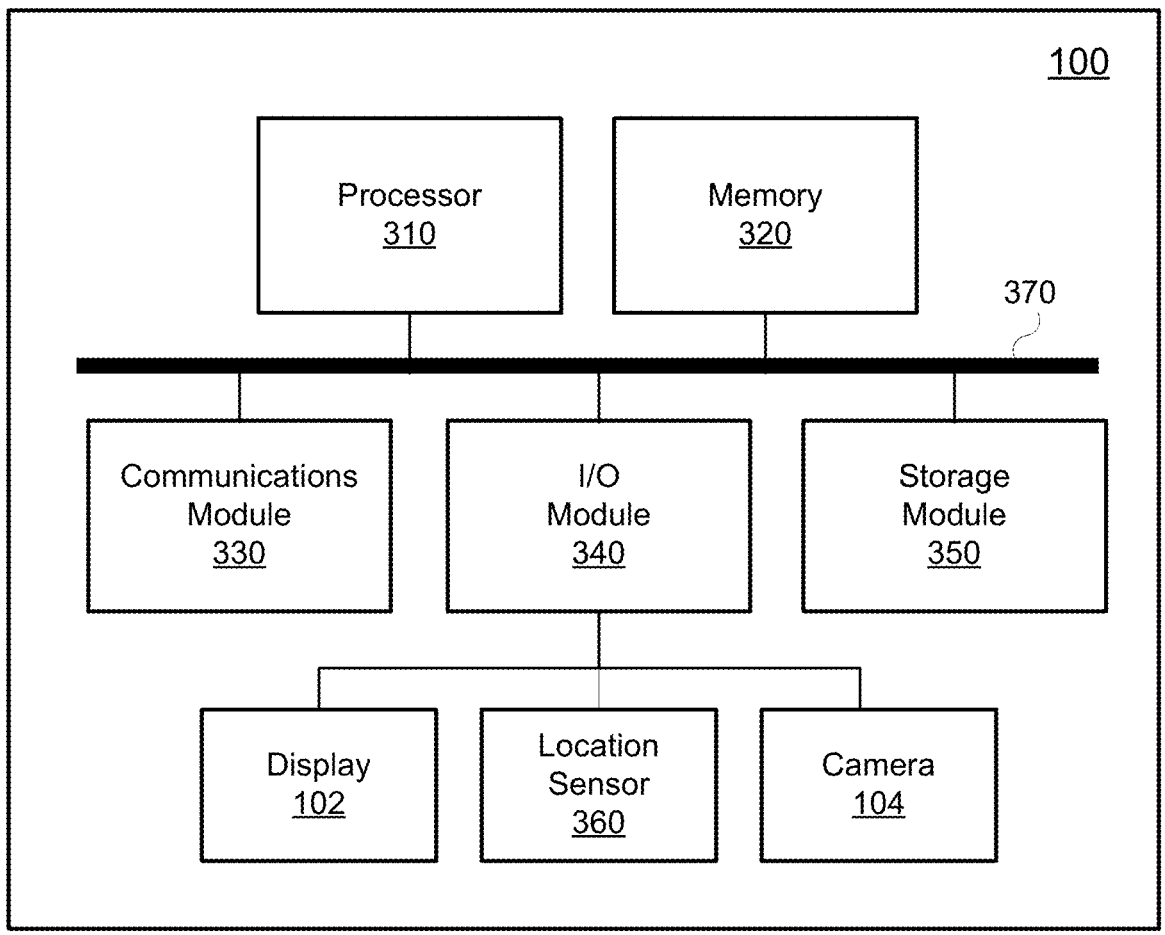
FIG. 3 is a high-level schematic diagram of the mobile device of FIGS. 2A and 2B.

FIG. 3 is a high-level schematic diagram of the mobile computing device 100.

The mobile computing device 100 includes a variety of modules. For example, as illustrated, the mobile computing device 100 may include a processor 310, a memory 320, a communications module 330, and/or a storage module 350. As illustrated, the foregoing example modules of the mobile computing device 100 are in communication over a bus 370.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the mobile computing device 100.

The communications module 330 allows the mobile computing device 100 to communicate with other computing devices and/or various communications networks such as, for example the network 120. For example, the communications module 330 may allow the mobile computing device 100 to send or receive communications signals. Communications signals may be sent or received according to one or more protocols or according to one or more standards. For example, the communications module 330 may allow the mobile computing device 100 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the mobile computing device 100 to communicate using near-field communication (NFC), via Wi-Fi™, using Bluetooth™ or via some combination of one or more networks or protocols. In some embodiments, all or a portion of the communications module 330 may be integrated into a component of the mobile computing device 100. For example, the communications module 330 may be integrated into a communications chipset.

The I/O module 340 is an input/output module. The I/O module 340 allows the mobile computing device 100 to receive input from and/or to provide input to components of the mobile computing device 100 such as, for example, various input modules and output modules. For example, the I/O module 340 may, as shown, allow the mobile computing device 100 to receive input from and/or provide output to the display 102 and/or the camera 104.

Additionally, the I/O module 340 may receive input from a location sensor 360. The location sensor 360 may allow a geographic location of the mobile computing device 100 to be ascertained. For example, the location sensor 360 may utilize and may include or may interact with a receiver of one or more of satellite-based location systems, such as, for example, global positioning satellite (GPS), GLONASS, BeiDou Navigation Satellite System (BDS), and/or Galileo in order to locate the mobile computing device 100. Additionally or alternatively, the location sensor 360 may employ other techniques/technologies for geographic location determination such as, for example, cell-tower triangulation and/or the use of wireless (e.g., Wi-Fi™) hotspot location data. In some embodiments, the location sensor 360 may be omitted and the function of the location sensor 360 may be performed by or using other components of the mobile computing device 100. In a particular example, a geographic location may be determined using the communications module 330 such as, for example, where cell-tower triangulation and/or wireless hotspot location data is employed in determining location.

The storage module 350 allows data to be stored and retrieved. In some embodiments, the storage module 350 may be formed as a part of the memory 320 and/or may be used to access all or a portion of the memory 320. Additionally or alternatively, the storage module 350 may be used to store and retrieve data from persisted storage other than the persisted storage (if any) accessible via the memory 320. In some embodiments, the storage module 350 may be used to store and retrieve data in/from a database. A database may be stored in persisted storage. Additionally or alternatively, the storage module 350 may access data stored remotely such as, for example, as may be accessed using a local area network (LAN), wide area network (WAN), personal area network (PAN), and/or a storage area network (SAN). In some embodiments, the storage module 350 may access data stored remotely using the communications module 330. In some embodiments, the storage module 350 may be omitted and its function may be performed by the memory 320 and/or by the processor 310 in concert with the communications module 330 such as, for example, if data is stored remotely.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
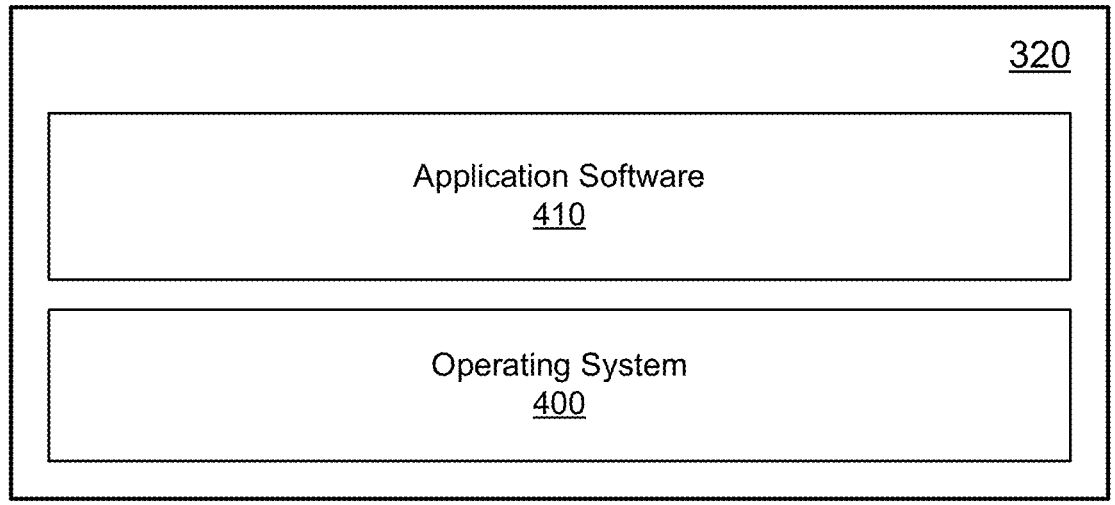
FIG. 4 shows a simplified organization of software components stored in a memory of the mobile device of FIGS. 2A and 2B.

FIG. 4 depicts a simplified organization of software components stored in the memory 320 of the mobile computing device 100. As illustrated, these software components include an operating system 400 and an application software 410.

The operating system 400 is software. The operating system 400 allows the application software 410 to access the processor 310 (FIG. 3), the memory 320, the communications module 330, the I/O module 340, and the storage module 350 of the mobile computing device 100. The operating system 400 may be, for example, Google™ Android™, Apple™ iOS™, UNIX™, Linux™, Microsoft™ Windows™, Apple OSX™ or the like.

The application software 410 adapts the mobile computing device 100, in combination with the operating system 400, to operate as a device providing access to location-based appointment information operations.

Where the mobile computing device 100 is a smartphone or tablet, the application software 410 may itself be or may be a part of a smartphone or tablet application or "app". In a particular example, the application software 410 may be a part of an application associated with particular provider of services by appointment. For example, where the appointments are finance-related, the application software 410 may correspond to a finance related app such as, for example, an online banking app.

Figure 5:
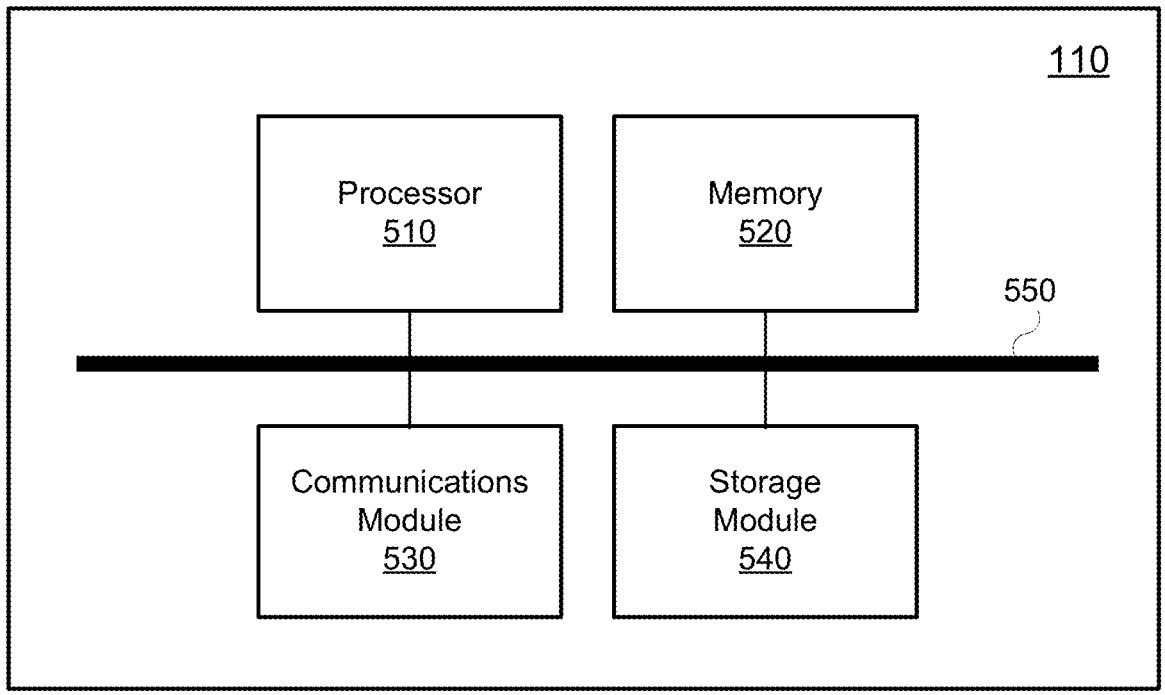
FIG. 5 is high-level schematic diagram of a server computing device.

FIG. 5 is a high-level schematic diagram of a computer server system 110.

The computer server system 110 includes a variety of modules. For example, as illustrated, the computer server system 110 may include a processor 510, a memory 520, a communications module 530, and/or a storage module 540. As illustrated, the foregoing example modules of the computer server system 110 are in communication over a bus 550.

The processor 510 is a hardware processor. The processor 510 may, for example, be one or more ARM, Intel x86, PowerPC processors or the like.

The memory 520 allows data to be stored and retrieved. The memory 520 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the computer server system 110.

The communications module 530 allows the computer server system 110 to communicate with other computing devices and/or various communications networks. For example, the communications module 530 may allow the computer server system 110 to send or receive communications signals. Communications signals may be sent or received according to one or more protocols or according to one or more standards. For example, the communications module 530 may allow the computer server system 110 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 530 may allow the computer server system 110 to communicate via Wi-Fi™, using Bluetooth™ or via some combination of one or more networks or protocols. In some embodiments, all or a portion of the communications module 530 may be integrated into a component of the computer server system 110. For example, the communications module may be integrated into a communications chipset.

The storage module 540 allows the computer server system 110 to store and retrieve data. In some embodiments, the storage module 540 may be formed as a part of the memory 520 and/or may be used to access all or a portion of the memory 520. Additionally or alternatively, the storage module 540 may be used to store and retrieve data from persisted storage other than the persisted storage (if any) accessible via the memory 520. In some embodiments, the storage module 540 may be used to store and retrieve data in a database. A database may be stored in persisted storage. Additionally or alternatively, the storage module 540 may access data stored remotely such as, for example, as may be accessed using a local area network (LAN), wide area network (WAN), personal area network (PAN), and/or a storage area network (SAN). In some embodiments, the storage module 540 may access data stored remotely using the communications module 530. In some embodiments, the storage module 540 may be omitted and its function may be performed by the memory 520 and/or by the processor 510 in concert with the communications module 530 such as, for example, if data is stored remotely.

Software comprising instructions is executed by the processor 510 from a computer-readable medium. For example, software may be loaded into random-access memory from persistent storage of the memory 520. Additionally or alternatively, instructions may be executed by the processor 510 directly from read-only memory of the memory 520.

Figure 6:
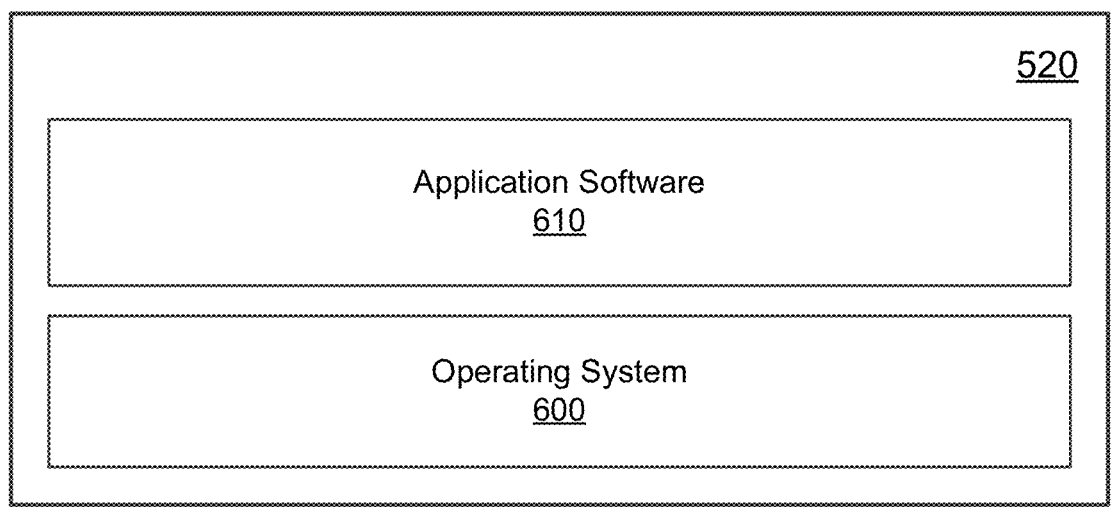
FIG. 6 shows a simplified organization of software components stored in a memory of the server computing device of FIG. 5.

FIG. 6 depicts a simplified organization of software components stored in the memory 520 of the computer server system 110 (FIG. 4). As illustrated, these software components include an operating system 600 and an application software 610.

The operating system 600 is software. The operating system 600 allows the application software 610 to access the processor 510 (FIG. 4), the memory 520, and the communications module 530 of the computer server system 110 (FIG. 4). The operating system 600 may be, for example, UNIX™, Linux™, Microsoft™ Windows™, Apple OSX™ or the like.

For example, the application software 610 may cooperate with the operating system 600 to adapt a suitable embodiment of the computer server system 110 to co-operate with a mobile computing device to provide access to location-based appointment information operations.

The operation of the mobile computing device 100 in providing access to location-based appointment operations will now be described with reference to a flowchart 700 of FIG. 7. Operations starting from an operation 702 and continuing onward are performed by the processor 310 of the mobile computing device 100 executing software such as, for example, a suitable instance of the application software 410 (FIG. 4).

It may be that appointment related functionality is only provided responsive to user input. Conveniently, this may mean that appointment-related information and access to appointment-related actions are only provided when actually desired. For example, in this way, nuisance offers of appointments not actually desired by an operator of the mobile computing device 100 may be avoided. For example, if the user visits a physical location where appointments are schedulable but has no desire to perform actions related to appointments at that location or at that location at a given instant, it may be that they can avoid being bothered with spurious offers of information related to appointments by simply not accessing that functionality. In other words, it may be that neither appointment-related information nor actions related to appointments will be provided by the mobile computing device 100 and/or to the mobile computing device 100 by the computer server system 110 unless input indicating an instruction to access or perform actions related to appointments has been received by the mobile computing device 100. Indeed, it may be that such functionality and information is only provided where input is received by the mobile computing device 100 indicating a desire to access appointment related information and/or actions.

At the operation 702, input is received indicating an instruction to perform an action related to appointments. The input may be received by way of an input module of the mobile computing device 100 such as, for example, by way of the display 102 where it is a touch screen. In one example, the input may correspond to launching an appointment-related application such as may correspond to the application software 410. Additionally or alternatively, input may be received invoking an appointment function of such an application. In a particular example, where the application software 410 is a financial-services-related application, the input may correspond to launching the financial services related application and/or invoking an appointment function thereof.

Responsive to the input received at the operation 702, an operation 704 is next.

At the operation 704, it is determined whether the mobile computing device 100 is proximate a location where appointments are schedulable. If so, an operation 706 is next. If not, appropriate output may be provided such as, for example, an indication that location-based appointment operations are not available at the present location.

All manner of locations where appointments may be schedulable are contemplated. For example, where the appointments are for receiving medical treatment, the location may correspond to a medical clinic. In another example, appointments may correspond to legal consultations available at a lawyer's office. In yet another example, financial services such as, for example, appointments for financial planning, investment, loan and/or other financial services may be available at a financial office or outlet such as, for example, a bank branch.

That the mobile computing device 100 is in a physical location where appointments are schedulable may be determined in a variety of manners.

In some embodiments, determining that the mobile computing device 100 is in a physical location where appointments are schedulable may include determining a location of the mobile computing device 100. The location of the mobile computing device 100 may be determined in a variety of manners as further described below. For example, a location of the mobile computing device 100 may be determined using a location module of the mobile computing device 100. In a particular example, the location sensor 360 and/or other hardware providing corresponding functionality thereto may be employed. For example, triangulation and/or wireless hotspot location data may be employed to determine a location of the mobile computing device 100 as discussed above.

Once a location of the mobile computing device 100 is determined, it may be processed in one or more manners in order to determine whether it corresponds to a physical location where appointments are schedulable.

In a first example of determining whether a given location of the mobile computing device 100 corresponds to a physical location where appointments are schedulable, the location may be compared to one or more definitions of areas, the areas defining boundaries of physical locations where appointments are schedulable. The definitions of such areas or "geo-fence" may take a variety of forms. For example, the geo-fences may be one or more polygons or geometric shapes described using one or more coordinates and/or distances in some co-ordinate system such as, for example, longitude and latitude. In a particular example, a geo-fence may correspond to a polygon defined by a plurality of vertices outlining a physical area corresponding to a location where appointments are schedulable.

Figure 8:
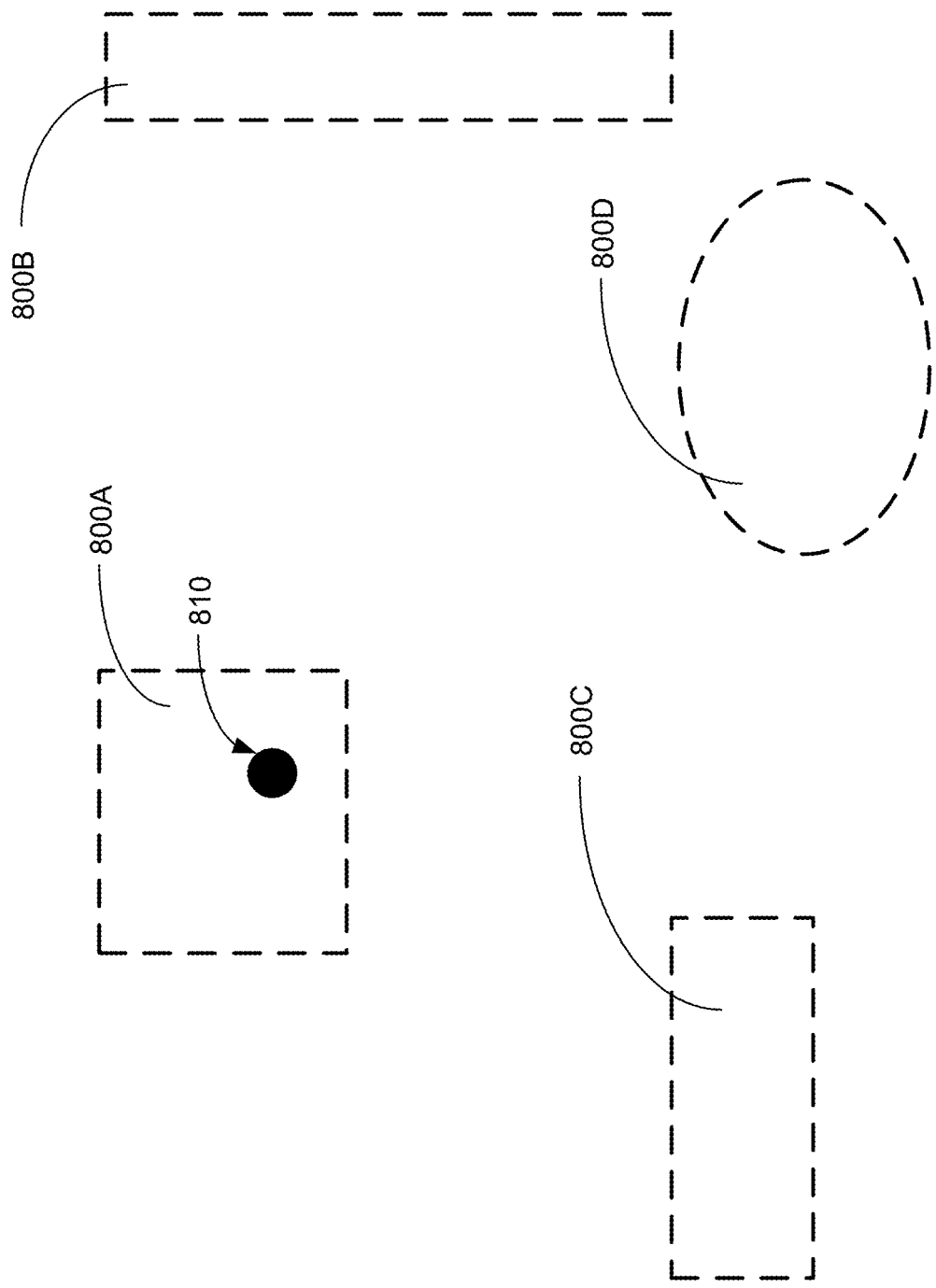
FIG. 8 shows how a location of a mobile device may be compared to one or more geo-fences corresponding to physical locations where appointments are schedulable.

A particular example of determining whether a given location of the mobile computing device 100 is within any of a set of geo-fences will now be discussed with reference to FIG. 8.

As illustrated, a set of geo-fences 800A-D are shown with their boundaries depicted in stippled lines. In particular, a geo-fence 800A, a geo-fence 800B, a geo-fence 800C, and a geo-fence 800D are shown.

An example location 810 of the mobile computing device 100 is also shown. As illustrated, the example location 810 is within the geo-fence 800A.

The example location 810 may be compared to the geo-fences 800A-D in a variety of manners to determine whether the example location 810 is within one of the geo-fences 800A-D and to find that the example location is within the geo-fence 800A.

For example, the mobile computing device may receive or maintain data describing the various geo-fences. Data describing the various geo-fences may be received via the network 120 such as, for example, from the computer server system 110. In other example, such data may, additionally or alternatively, may be maintained in storage such as may, for example, be accessed by way of the storage module 350. In a particular example, a cache of geo-fence data may be maintained in storage of the mobile computing device 100 and periodically updated or revised based on information received from one or more servers. In another example, determining whether the example location 810 falls within a geo-fence may be determined by one or more servers such as, for example, by sending the example location 810 to a server such as, for example, the computer server system 110. In a particular example, the example location 810 could be determined by the mobile computing device 100 and sent to the computer server system 110 responsive to the input received at the operation 702. In any event, the server may determine which, if any, geo-fence the example location 810 falls within. Upon determining that the example location 810 falls within a geo-fence, the server may provide an identification of that geo-fence and/or the corresponding physical location to the mobile computing device 100 such as, for example, by way of the network 120. Additionally or alternatively, responsive to determining that the example location 810 falls within a geo-fence, the server may send information related to scheduling appointments at a corresponding physical location, with that information then potentially being received by the mobile computing device such as, for example, at an operation 706 as further described below.

In a second example of determining whether a given location of the mobile computing device 100 corresponds to a physical location where appointments are schedulable, a location of the mobile computing device 100 may be compared to one or more points corresponding to physical locations where appointments are schedulable. In particular, a distance between the location of the mobile computing device 100 and a given one of the one or more points may be considered to determine whether it is less than a threshold amount. If so, then the mobile computing device 100 may be determined to be proximate to the physical location corresponding to the given point. The distance may be determined in a variety of manners. In some cases, the distance may correspond to Euclidean distance between the points. In another example, the distance could be a distance measured relative to the Earth such as, for example, a great circle (orthodromic) distance. The aforementioned threshold amount may be determined in a variety of manners. For example, it could be that a defined threshold amount is used in evaluating distances between each of the one or more points and the location of the mobile computing device 100. In another example, there may be a respective threshold amount associated with various of the one or more points and for those points, the mobile computing device 100 will only be considered proximate a physical location corresponding to a given one of those points if the distance between the location of the mobile computing device 100 and the given one of the points is within the respective threshold amount associated with that point.

Notably, depending on the selection of the threshold amount(s) and the relative locations of the one or more points, it is possible that the mobile computing device 100 will be considered proximate more than one point. In such cases, it could be that a tie-breaker rule is employed such as, for example, considering the mobile computing device 100 to be proximate the physical location corresponding to the nearest one of the points (i.e., the physical location corresponding to the point that is the shortest distance away). Additionally or alternatively, the physical locations may have associated priorities used in performing tie-breaking.

Figure 9:
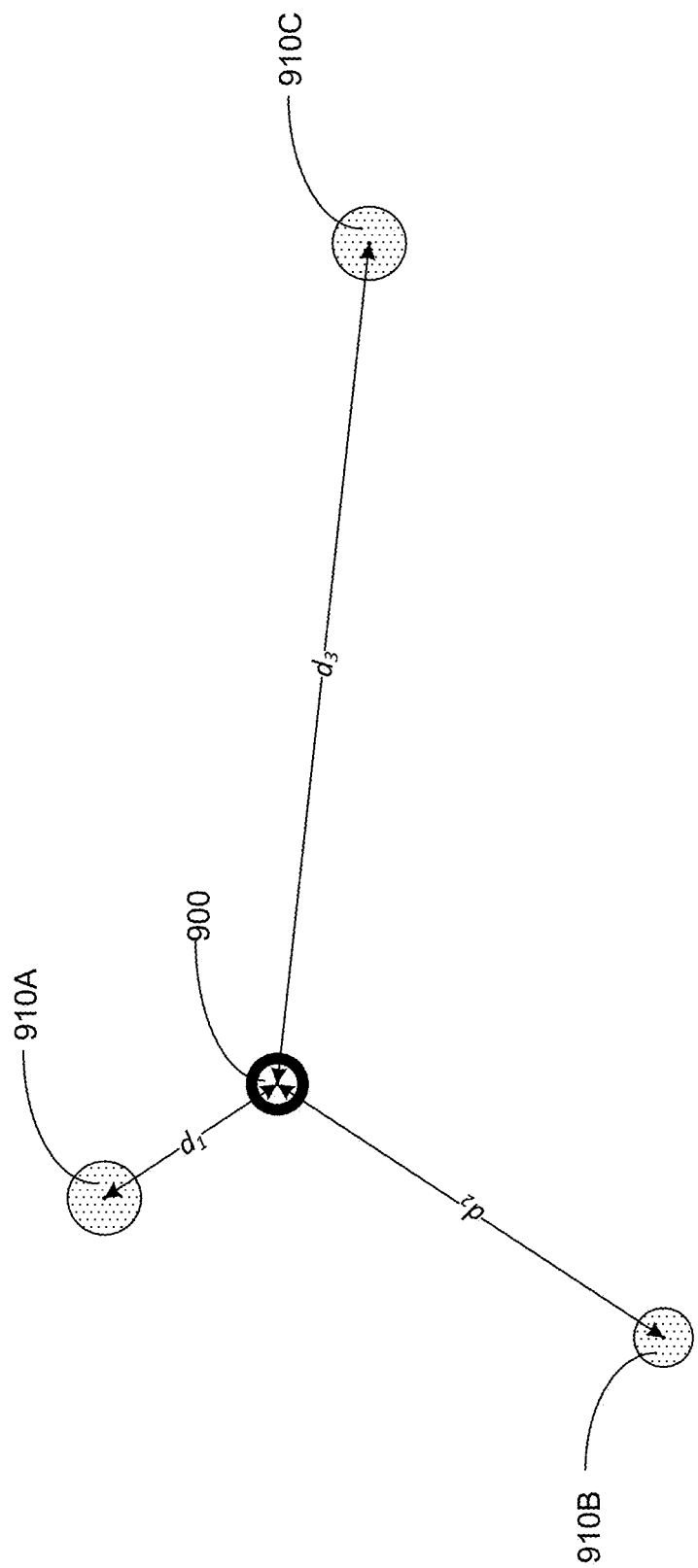
FIG. 9 shows how a location of a mobile device may be compared to locations of one or more physical locations where appointments are schedulable.

A particular example of determining whether a given location of the mobile computing device 100 is sufficiently close to a series of pre-defined points will now be discussed with reference to FIG. 9.

As illustrated, an example location 900 of the mobile computing device 100 may be compared to a series of points 910A-C. The points—point 910A, point 910B and point 910C— each correspond to physical locations where appointments are schedulable.

As shown, the example location 900 is a distance $d_1$ from the point 910A, a distance $d_2$ from the point 910B, and a distance $d_3$ from the point 910C, where $d_1 < d_2 < d_3$. It may be that only $d_1$ is less than the relevant threshold amount and therefore the mobile computing device is considered to be in a physical location corresponding to the point 910A. Alternatively, one or more of $d_1$, $d_2$ and $d_3$ may be less than a relevant threshold. In such circumstances, a tie breaker rule could be applied as discussed above. For example, it could be that in such circumstances the tiebreaker rule is the nearest point and so mobile computing device 100 is considered to be proximate the physical location corresponding to the nearest one of the points 910A-C. In other words, after tie breaking it could be that the mobile computing device 100 is considered to be in a location proximate the physical location corresponding to the closest one of the physical points, namely the point 910A.

The comparing of the location of the mobile computing device 100 to points corresponding to physical locations may be performed in a variety of manners. For example, analogous to as was discussed above regarding geo-fences, data about points may be obtained over the network 120 and/or may be retrieved from storage such as by way of the storage module 350 and then the location of the mobile computing device 100 may be compared to the points based on that data. Further it could be that the location of the mobile computing device 100 is sent to one or more servers such as, for example, the computer server system 110 which then compares that location to locations of one or more of points such as, for example, based on information maintained in storage of the server.

In another example of determining whether a given location of the mobile computing device 100 corresponds to a physical location where appointments are schedulable, one or more methods of making such a determination may be applied in combination. For example, it could be that the technique of comparing to points is applied using midpoints of geofences to identify potentially relevant geo-fences. The location of the mobile computing device 100 may then be compared to the potentially relevant geo-fences. Notably, it may be that comparing a location to a geo-fence is more computationally complex than computing a distance between two points. However, it may also be that geo-fences offer a more accurate determination of whether a mobile computing device 100 should actually be considered proximate a particular physical location. Accordingly, it may be that by combining techniques as discussed, comparisons of a location to one or more irrelevant ones of the geo-fences is avoided while still obtaining the enhanced accuracy provided by employing geo-fences. In this way, computational efficiency may be improved as compared to comparing to geo-fences directly. Furthermore, it may be that by so combining techniques, the benefits associated with employing geo-fences in determining whether a given location of the mobile computing device 100 corresponds to a physical location are still obtained.

Some methods of determining that the mobile computing device 100 is in a physical location where appointments are schedulable may include the mobile computing device 100 capturing an image of a portion of an environment in which the mobile computing device 100 is located. For example, such an image may be captured using an image capture module of the mobile computing device 100. In a particular example, the image may be captured by the mobile computing device 100 using the camera 104 (FIGS. 2B and 3).

The captured image may then be used in determining that the mobile computing device 100 is proximate a particular physical location based on the captured image including a particular physical object expected in the physical location.

For example, the captured image of the portion of the environment may be analyzed using image recognition techniques to recognize features of a particular physical location and determine that the mobile computing device 100 is, therefore, proximate that particular physical location. Such an analysis may be performed by the mobile computing device 100. Additionally or alternatively, such an analysis may be performed by a server such as, for example, the computer server system 110. In a particular example, the computer server system 110 may receive an indication of the captured image from the mobile computing device 100 via the network 120 and may, responsive to receipt of the indication, analyze the indication using image recognition techniques to recognize features of a particular physical location and determine that the mobile computing device 100 is, therefore, proximate that particular physical location. An indication of that physical location may then be sent to the mobile computing device 100 via the network 120 by the computer server system 110. Additionally or alternatively, the computer server system 110 may sent, responsive to determining based on a captured image that the mobile computing device is proximate a particular physical location, send information related to scheduling appoints at that physical location, with that information then potentially being received by the mobile computing device 100 such as, for example, at the operation 706 as further described below.

In another example, physical items for identifying physical locations may be intentionally provided. For example, printed items that may server as "visual targets" may be provided in physical locations where appointments are schedulable, with each target corresponding to a respective physical location. The targets may include visual features allowing a given target to be distinguished from other targets based on a captured image. As such, by capturing an image of a target using mobile computing device 100, it may be not only detected but furthermore demonstrated with some confidence that the mobile computing device 100 is in a particular physical location. Accordingly, it may be that the captured image of the portion of the environment is analyzed to recognize a particular target associated with a particular physical location, thereby allowing it to be determined that the mobile computing device 100 is proximate that physical location. Such an analysis may be performed by the mobile computing device 100. Additionally or alternatively, such an analysis may be performed by a server (such as, for example, the computer server system 110) based on an indication of the captured image sent to the server by the mobile computing device 100 (e.g., via the network 120) analogous to as was discussed above with regard to the possible analysis of a captured image using image recognition techniques.

Figure 10:
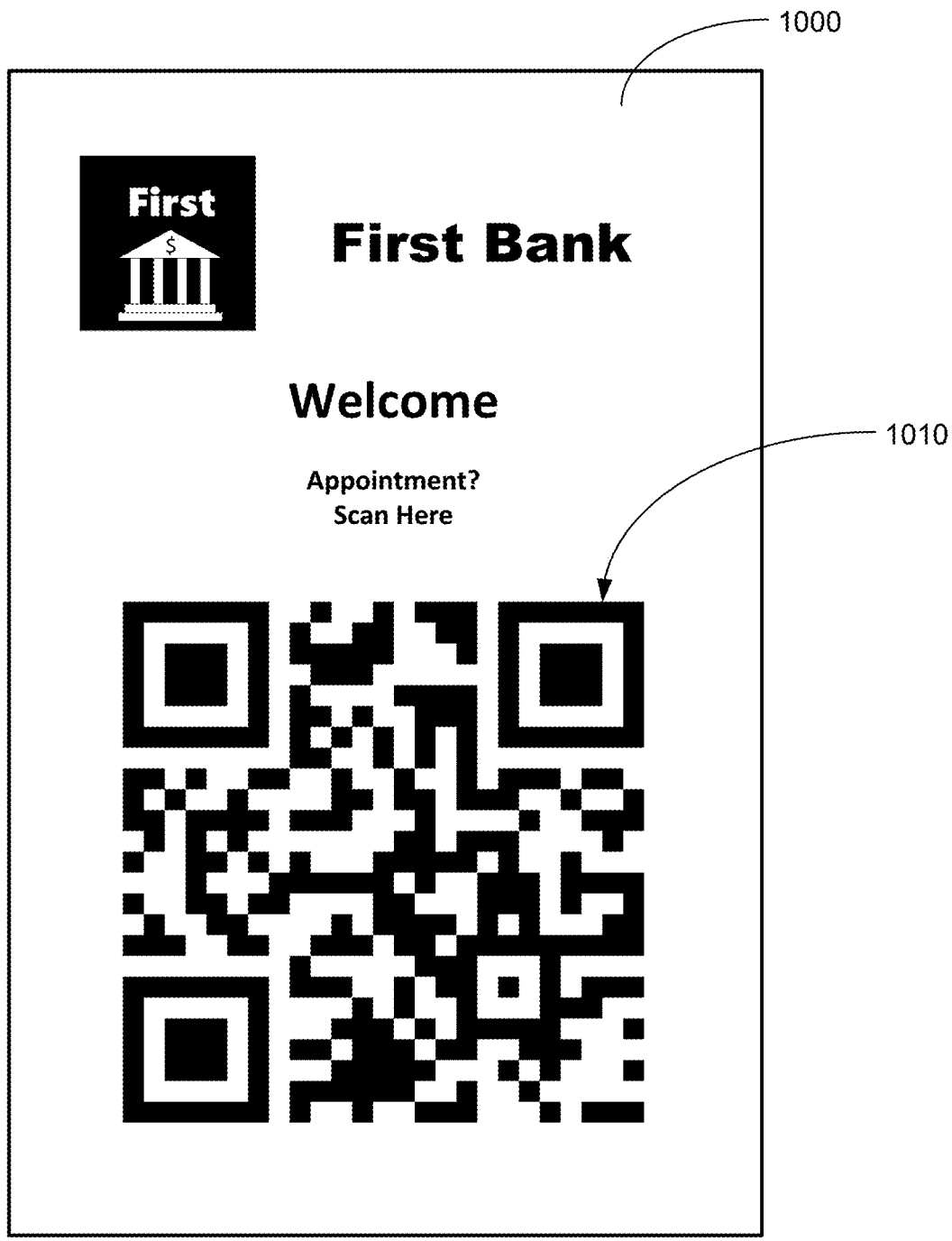
FIG. 10 shows an example physical item as may be used in determining that a mobile device is in a particular physical location.

An example target as may be provided identifying a particular physical location where appointments are schedulable is shown in FIG. 10.

FIG. 10 shows an example poster 1000 as may be displayed in a particular physical location where appointments are schedulable. As shown, the example poster 1000 includes a machine-readable indicium 1010. The machine-readable indicium 1010 includes information identifying a particular physical location.

In particular, the example poster 1000 is branded by a financial institution and may identify a particular bank branch. Notably, the machine-readable indicium 1010 is a QR-code with a payload providing a branch identifier, "First Bank Branch #23", such as may correspond to a particular branch of the financial institution. In other words, a target may include a machine-readable indicium providing metadata identifying a corresponding physical location.

As mentioned, the machine-readable indicium 1010 is a QR-code though this is merely by way of example and other forms of machine-readable indicia may be used including, for example, barcodes using other barcode symbologies such as, for example, PDF417, Code 39 or the like. In another example, machine-readable indicia other than barcodes may, additionally or alternatively, be employed.

It may be that an image of a portion of an environment is captured responsive to user input. For example, a user interface may be provided by the mobile computing device 100 allowing a user of the mobile computing device 100 to collect such an image. Notably, where a user is required to initiate capturing of a portion of environment where the mobile computing device 100 is situated, it may be that the input capturing such an image and/or the captured image is the input indicating an instruction to perform an action related to appointments received at the operation 702 (FIG. 7).

Figure 11:
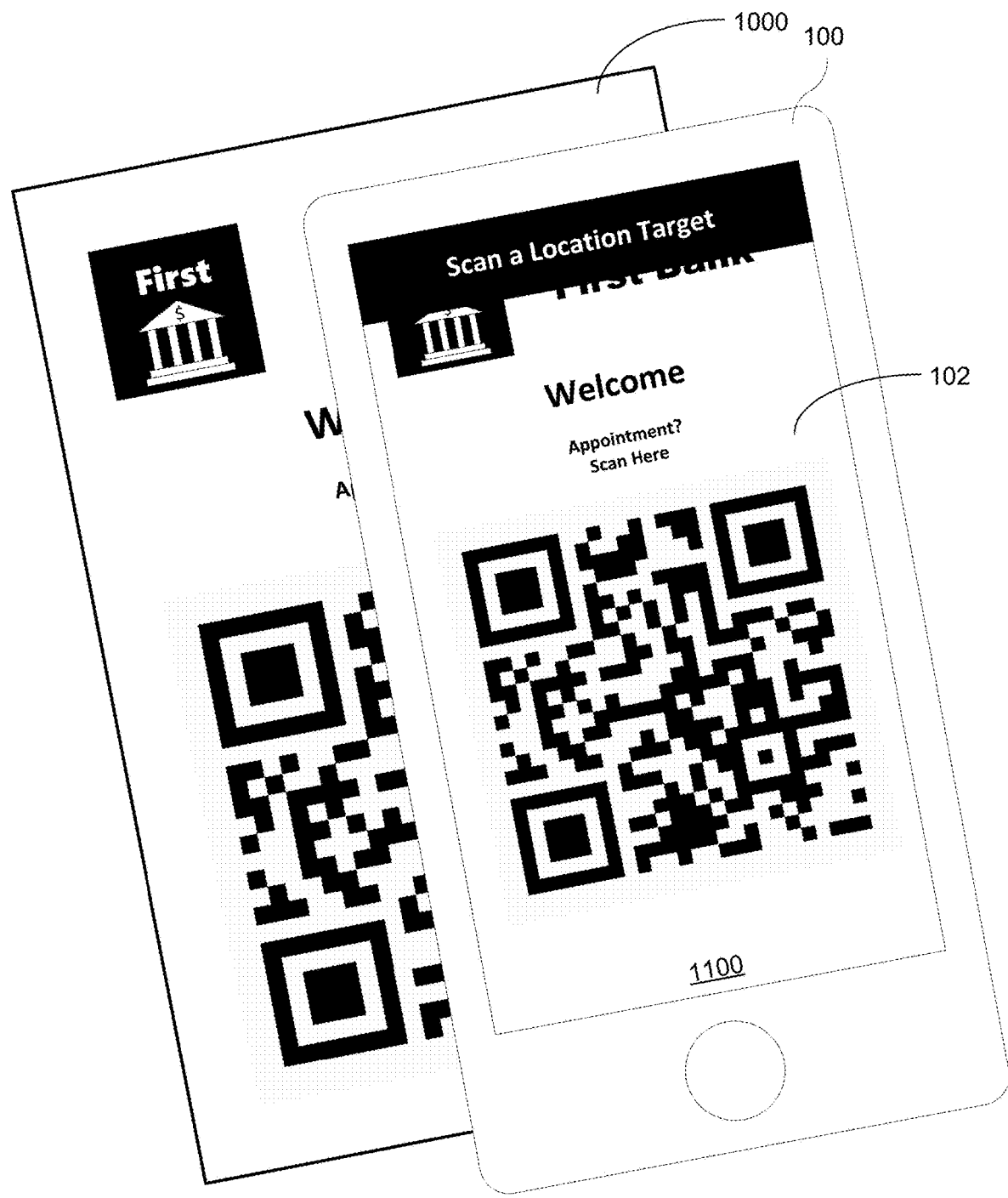
FIG. 11 illustrates capturing a machine-readable indicium of the example printed item of FIG. 10 using the mobile device of FIGS. 2A and 2B.

FIG. 11 shows an example user interface 1100 as may be displayed on the display 102 of the mobile computing device 100. As illustrated, the example user interface 1100 instructs the user on using the camera 104 (FIGS. 2B and 3) of the mobile computing device 100 to scan a printed article (target) associated with a particular physical location. For example, as illustrated, the example poster 1000 may be captured by way of the example user interface 1100. As shown, a preview of the image may be provided on the display 102. In some embodiments, an image may be automatically captured. For example, it could be that a "live" preview is provided by the example user interface 1100, with images being periodically (or even continuously) captured and used to update the example user interface 1100. As they are captured, the images may also be analyzed to determine whether a target is detected and/or whether metadata thereof can be extracted (e.g., using barcode reading/recognition techniques). If so, that image may be saved and treated as the captured image. Additionally or alternatively, the example user interface 1100 may include a user interface control (not shown) allowing a user to, once satisfied that the preview shows a printed article associated with a particular physical location, provide input to trigger capturing of the image that will be analyzed in determining a physical location to which the mobile computing device 100 is proximate.

In some embodiments, the target may contain additional metadata beyond information identifying a particular physical location. For example, the target could encode an expiry date. Such an expiry date could be validated as a part of determining that the mobile computing device 100 is in a particular location, and, more particularly, with such validation blocking or limiting the ability to use an expired target to check-in at a given location. In this way, the risk of a target being pilfered and being repeatedly utilized to that the mobile computing device 100 is in a particular location when it actually is not may be mitigated. Additionally or alternatively, a digital signature may be encoded in the target allowing a given target to be confirmed as genuine with only genuine targets being usable in determining that the mobile computing device 100 is at particular locations. Metadata such as an expiry date and/or a digital signature may be encoded in a machine-readable indicium providing information allowing identification of particular physical location and/or may be provided separately such as, for example, by way of one or more additional machine-readable indicia on a target.

In some embodiments, the above-discussed manners of determining that the mobile computing device 100 is proximate a physical location where appointments are schedulable may be combined.

For example, it could be that the mobile computing device 100 will be considered to be proximate a particular physical location if either a determination based on a determined location of the mobile computing device 100 or an image captured of a portion of an environment in which the mobile computing device 100 is located suggest that the mobile computing device 100 is located in a particular location. Conveniently, in this way, where the location of the mobile computing device 100 can be detected using a location module, the need to scan a target may be avoided. Further, if location cannot be detected using a location module and/or the detected location is not sufficiently accurate—such as, for example, may occur in dense urban environments, in dense vegetation, and/or underground—the mobile computing device 100 may be used to scan a location target allowing a determination that the mobile computing device 100 is proximate in a particular physical location, namely a physical location corresponding to that target, to be made despite any deficiency of location determination using a location module in that location.

In another example, it could be that the mobile computing device 100 will only be considered to be proximate a particular physical location if a determination based on a determined location of the mobile computing device 100 and a determination based on an image captured of a portion of an environment in which the mobile computing device 100 is located both suggest that the mobile computing device 100 is located proximate a particular physical location. Notably, this may provide greater assurance that the mobile computing device 100 is indeed located in a particular physical location as compared to a determination based on either method taken alone.

For example, some technologies employed by location modules may, as mentioned above, be inaccurate in some circumstances. Furthermore, some location determination techniques/technologies can be vulnerable to spoofing or tampering whereby an attacker or a malicious user could cause a false location of the mobile computing device 100 to be detected. Furthermore, where a target alone is employed, targets could be vulnerable to pilfering. A pilfered or counterfeit target moved to another location could allow a malicious user to spoof the mobile computing device 100 being proximate a particular physical location. One or more of such limitations of either technique may be avoided or mitigated by employing them in combination.

Notably, a greater assurance that the mobile computing device 100 is in a particular physical location may be desirable before providing access to appointment services for a variety of reasons. For example, it may be a regulatory requirement that appointments and access to corresponding actions is only provided in a licensed location. Additionally or alternatively, it may be that an assurance that the mobile computing device 100 is in a particular physical location before providing access to appointment related actions generally and/or particular actions in relation to appointments to avoid user misbehaviour. For example, it may be desirable to ensure that the mobile computing device 100 is present at a particular physical location before allowing it to be used to check-in for an appointment at that location. This may, for example, provide greater confidence that the user will be ready to be seen immediately at the appointment time as they can be expected to be in the relevant physical location with greater confidence in this actually being the case.

Figure 7:
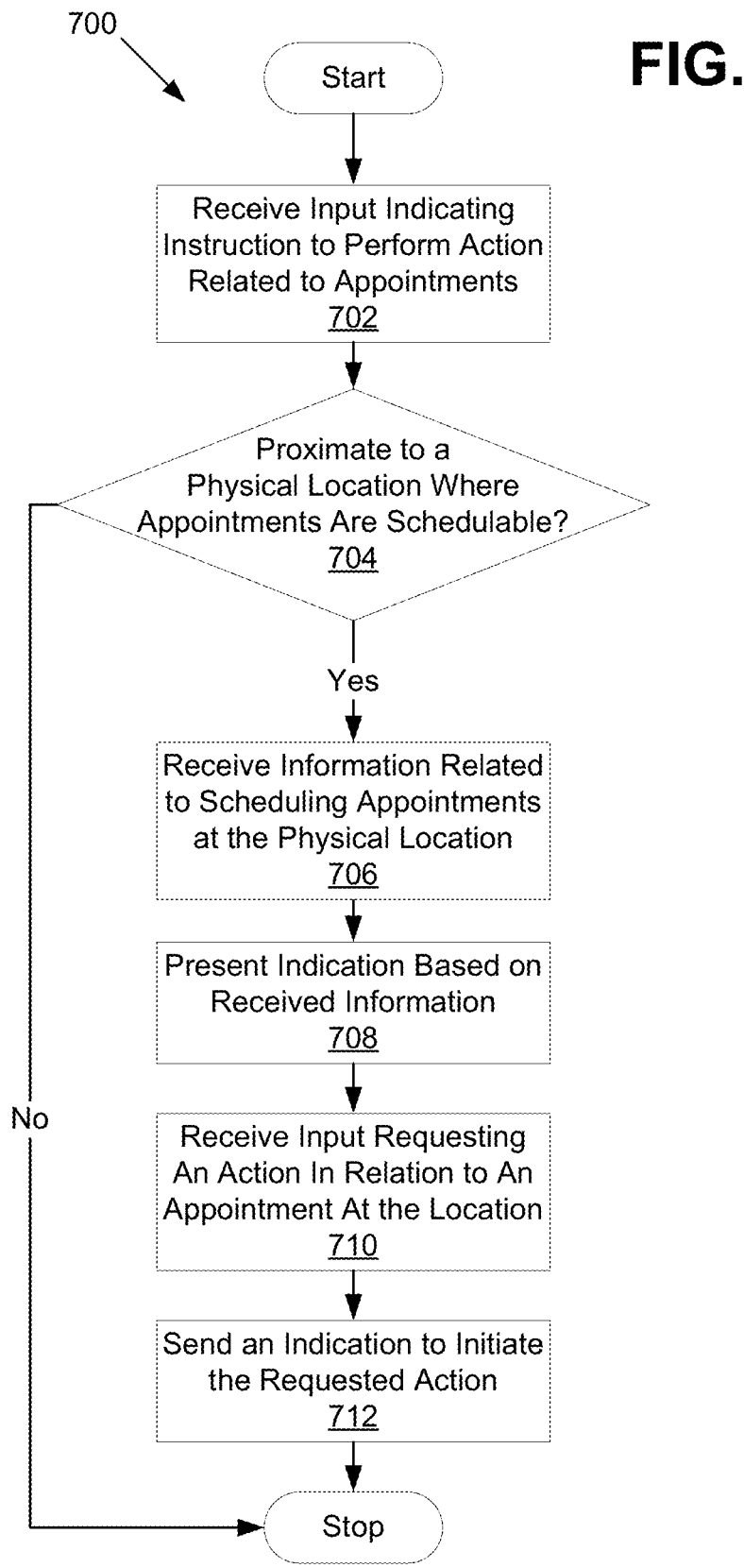
FIG. 7 is a flowchart showing operations performed by a mobile computing device in providing location-based appointment operations.

Returning to consideration of FIG. 7, if, as discussed above, at the operation 704, it is determined that the mobile computing device 100 is proximate a location where appointments are schedulable, then the operation 706 is next.

At the operation 706, information related to scheduling appointments at the physical location is received. The information may be prepared by and received from the computer server system 110. For example, the information may be received via the network 120 such as, for example, using the communications module 330. In a particular example, the information may be prepared and sent to the mobile computing device 100 by the computer server system 110 responsive to input such as, for example, receipt of information identifying a particular physical location as discussed above. For example, the mobile computing device 100 may sent the computer server system 110 information like location information and/or a captured image of a portion of an environment of the particular physical location as discussed above.

The received information may include, for example, information related to the physical location such as, for example, related contact information, hours and/or information available services, some or all of which might be available via appointment.

The information related to scheduling appointments at the physical location may include information related to available appointments at that physical location.

In some embodiments, a user may authenticate or log-in to the mobile computing device 100. The identity of the user may then be used to access a profile of the user. For example, an identification of the identity of the user may be provided to the computer server system 110 by the mobile computing device 100 via the network 120 and the computer server system 110 may use the identifying information in order to access a profile of the user (e.g., in a database). The profile may then be used to determine appointment-related actions available to the user. For example, where the physical location is a dental clinic, the profile may reflect information such as, for example, whether the user is eligible or due for a next cleaning, whether the user is eligible to schedule periodontal services, etc. In a particular example, it may be that the computer server system 110 is or communicates with an Electronic Medical Records System (EMRS) to access information about the user in order to determine whether make such a determination. In another example, where the physical location is a financial institution branch, the profile may identify whether the user is a business and/or a personal banking customer. Based on such an identification, the user may be provided only with information related to scheduling appointments for which they are eligible. For example, the computer server system 110 could determine, based on information about the user available in a profile and or records accessed based on the profile (e.g., a credit score, banking transaction information etc.) that the user is eligible for a certain service and that, therefore, the computer server system 110 should send mobile computing device 100 information related to scheduling an appointment to receive that service. In a particular example, where the physical location corresponds to a financial services outlet such as, for example, a bank branch, the computer server system 110 could determine that a user of the mobile computing device 100 is eligible for a pre-approved personal loan and may send the mobile computing device 100 information related to the pre-approval and scheduling an appointment with a loan officer for presentation to the user.

In some cases, an indication that a prior appointment associated with the mobile computing device 100 was previously scheduled for the physical location may be received. Such prior appointments may be identified based on the identifying information of the mobile computing device 100 such as, for example, a device serial number, an International Mobile Equipment Identity (IMEI) number and/or a Subscriber Identity Module (SIM) card Integrated Circuit Card Identifier (ICCID). Such identifying information may be provided to a server such as, for example, the computer server system 110 and, responsive to sending such identifying information, the computer server system may identify a prior appointment based on the identifying information and an indication thereof may be provided. For example, the information could be sent by the mobile computing; device 100 to the computer server system 110 via the network 120 and the computer server system 110 may reply to the mobile computing device 100 by sending information about that prior appointment. Additionally or alternatively, prior appointments may be identified based on the user of the mobile computing device 100 such, as for example where a user has logged in allowing a profile to be accessed as mentioned above. For example, identifying information about the user may, as discussed above, be provided by the mobile computing device to the computer server system 110, and the computer server system 110 may then use that information to identify prior appointments (e.g., based on a profile associated with the user). It may be that the indication that a prior appointment associated with the mobile computing device 100 was previously scheduled for the physical location is provided as a part of the received information related to scheduling appointments at the physical location. Alternatively, the indication may be provided separately such as, for example, by way of a separate communication (e.g., via the network 120). Notably, where a prior appointment was missed, the received information may include an option allowing rescheduling of a similar appointment (e.g., with the same person(s) and/or to receive the same service).

Following receipt of the information related to scheduling appointments at the physical location at the operation 706, an operation 708 is next.

At the operation 708, an indication based on the received information is presented. The indication may be presented via an output module of the mobile computing device 100. For example, a user interface could be presented using the display 102.

Figure 12:
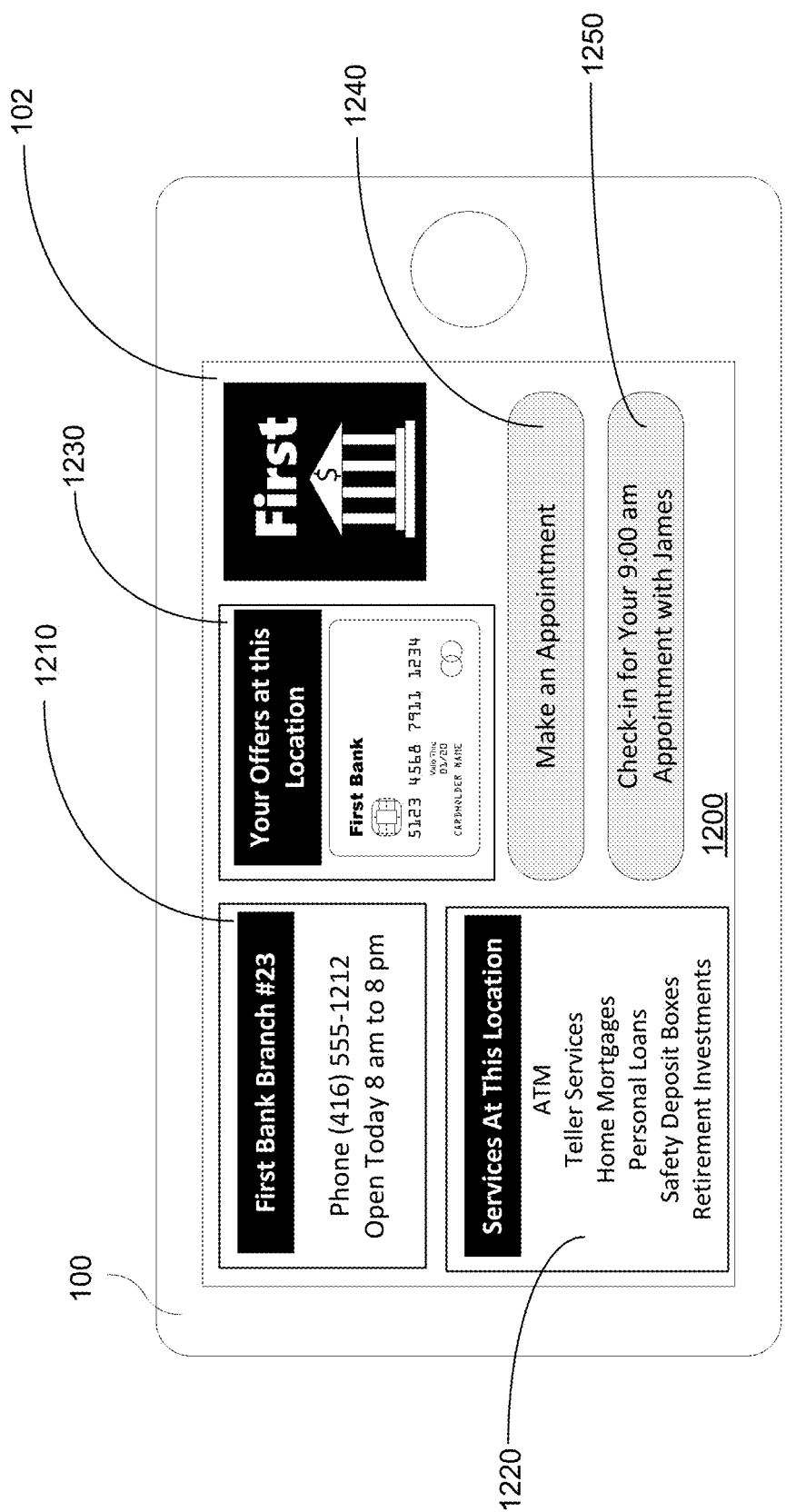
FIG. 12 shows an example user interface for information related to scheduling appointments at a physical location.

A particular example of a possible user interface is shown in FIG. 12.

FIG. 12 shows an example user interface 1200 providing indications of information related to scheduling appointments at a particular physical location. In particular, the information relates to a bank branch, "First Bank Branch #23".

As illustrated, the example user interface 1200 includes user interface elements 1210-1250.

A user interface element 1210 indicates contact information (phone number) for the bank branch as well as hours for the branch that day.

A user interface element 1220 provides information about services at this location. It may be that this list of services is customized. For example, it may be that, as mentioned above, the list has been customized based on the mobile computing device 100 and/or a logged-in user thereof. As illustrated, the services listed in the user interface element 1220 include only personal banking services, potentially because the mobile computing device 100 and/or a logged-in user thereof has been identified as associated with an account or profile for personal and not business banking services.

A user interface element 1230 provides information about an offer available at this location. This information could be provided based on identification of the mobile computing device 100 and/or the identification of a logged in user thereof such as, for example, in manners discussed above. For example, a profile associated with the user and/or the mobile computing device 100 may be accessed by the computer server system 110 and such a profile may be used to identify and/or provide one or more customized or personalized offers or promotions such as, for example, promotional offers such as may, for example, be available to that user by way of an appointment at the physical location. In other words, one or more promotions may be identified and provided to the mobile computing device 100 based on a profile associated with the mobile computing device 100 and/or a logged-in user thereof and such promotions may be identified by a server such as, for example, the computer server system 110, based on information identifying the mobile computing device 100 and/or a logged in user thereof. The server may send information about the identified promotions/offers to the mobile computing device 100. For example, in some embodiments, information about such promotions/offers may be included in the information related to scheduling appointments received at the operation 706 (FIG. 7).

Continuing discussion of FIG. 12, a user interface element 1240 provides an option to allow a user to make an appointment at the physical location.

A user interface element 1250 provides an option to check in for a previously scheduled appointment. For example, such an indication may be provided based on an indication that a prior appointment associated with the mobile computing device 100 was previously scheduled for the physical location, the possible receipt of which was discussed above. It may be detected that a current time (e.g., current date and/or wall clock time) are close enough to the time of that previously scheduled appointment. For example, it could be detected that the current time falls within an interval encompassing a start time of the prior appointment. In a particular example, check-ins could be allowed a specified number of minutes in advance of the start time of an appointment, e.g., 15 minutes. Additionally, check-ins could be permitted if it is detected that the current time is no later than a specified number of minutes following the start time of an appointment, e.g., 5 minutes. However determined, if it is determined/detected that the current time falls within an interval encompassing a start time of the prior appointment, then an option to check-in for the prior appointment may be provided such as, for example, by way of a user interface control such as, for example, the user interface element 1250. If, however, the user is too late to check-in and/or too early, then the user may be provided with another option related to the prior appointment (e.g., by way of a suitable user interface component such as may, for example, replace the user interface element 1250). For example, the user could be provided with an option to reschedule the appointment—e.g., to a later time (if too late) or an earlier time (if too early)— and/or to cancel it. In a particular example, if it is too early to check-in, then the user may be provided with an offer of one or more options for an earlier appointment. Such options could, for example, be provided by the computer server system 110 to the mobile computing device 100 based on there being a prior appointment associated with the mobile computing device 100 and/or a logged-in user thereof for which it is too early to check-in.

In some embodiments, the presentation of the received information may involve display of more than one user interface. For example, responsive to user input with one or more user interface elements of a first user interface, a second user interface may be presented with additional information related to scheduling appointments at the physical location.

Figure 13:
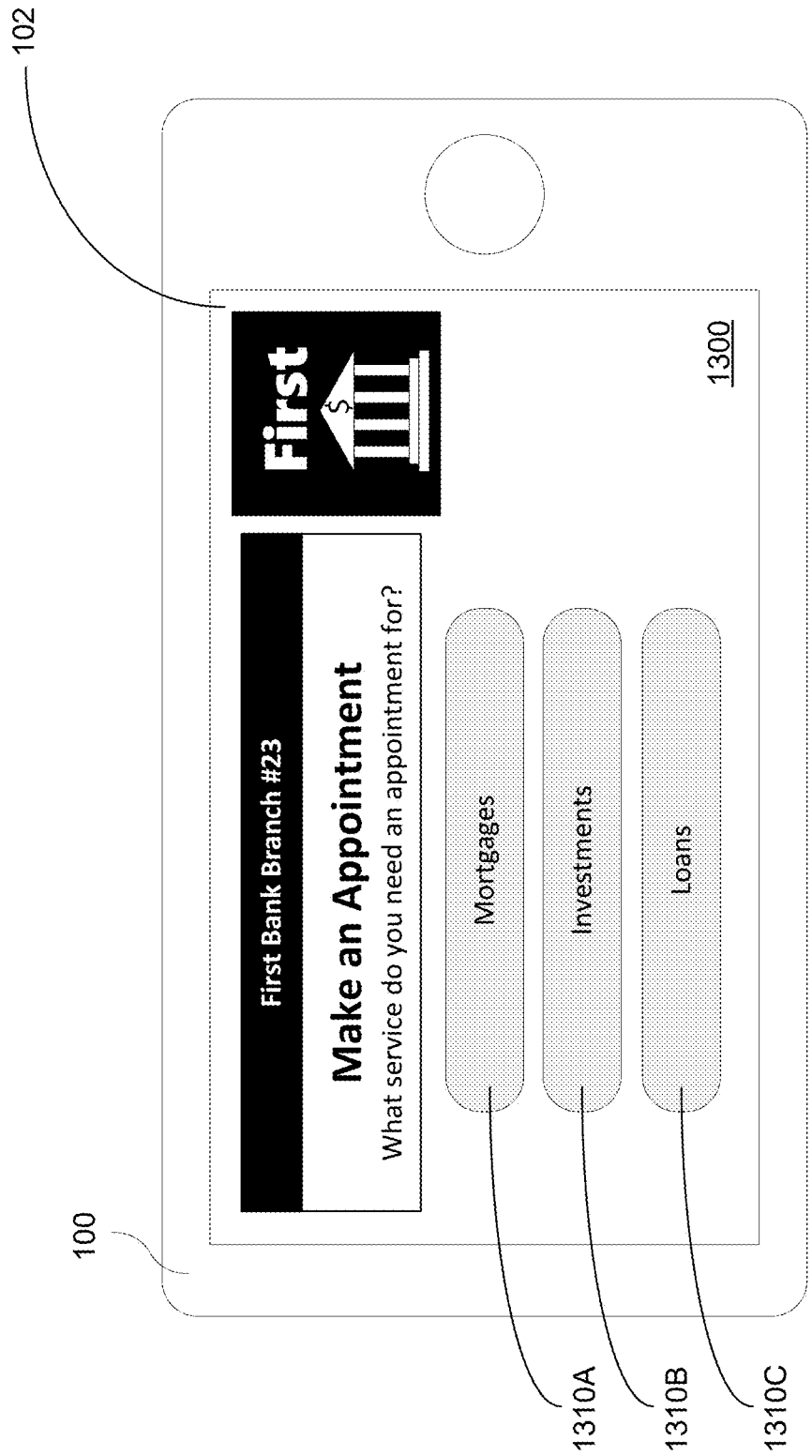
FIG. 13 shows an example user interface for scheduling an appointment at a physical location.

An example of a second user interface is shown in FIG. 13.

FIG. 13 shows a second user interface 1300 including user interface elements 1310A, 1310B, 1310C. The user interface elements 1310A-1310C collectively list types of appointment schedulable at a particular physical location. In some embodiments, it may be that this list is customized based on the mobile computing device 100 and/or a logged-in user thereof. For example, it may be that the computer server system 110 sends information for customizing the list to the mobile computing device 100 (e.g., via the network 120) based on a profile as may be identified in manners discussed above. The second user interface 1300 may be presented responsive to input received by the mobile computing device 100 such as, for example, input corresponding to an interaction with a user interface element. In a particular example, the second user interface 1300 could be displayed responsive to a selection of the user interface element 1240 of the example user interface 1200 (FIG. 12).

Figure 14:
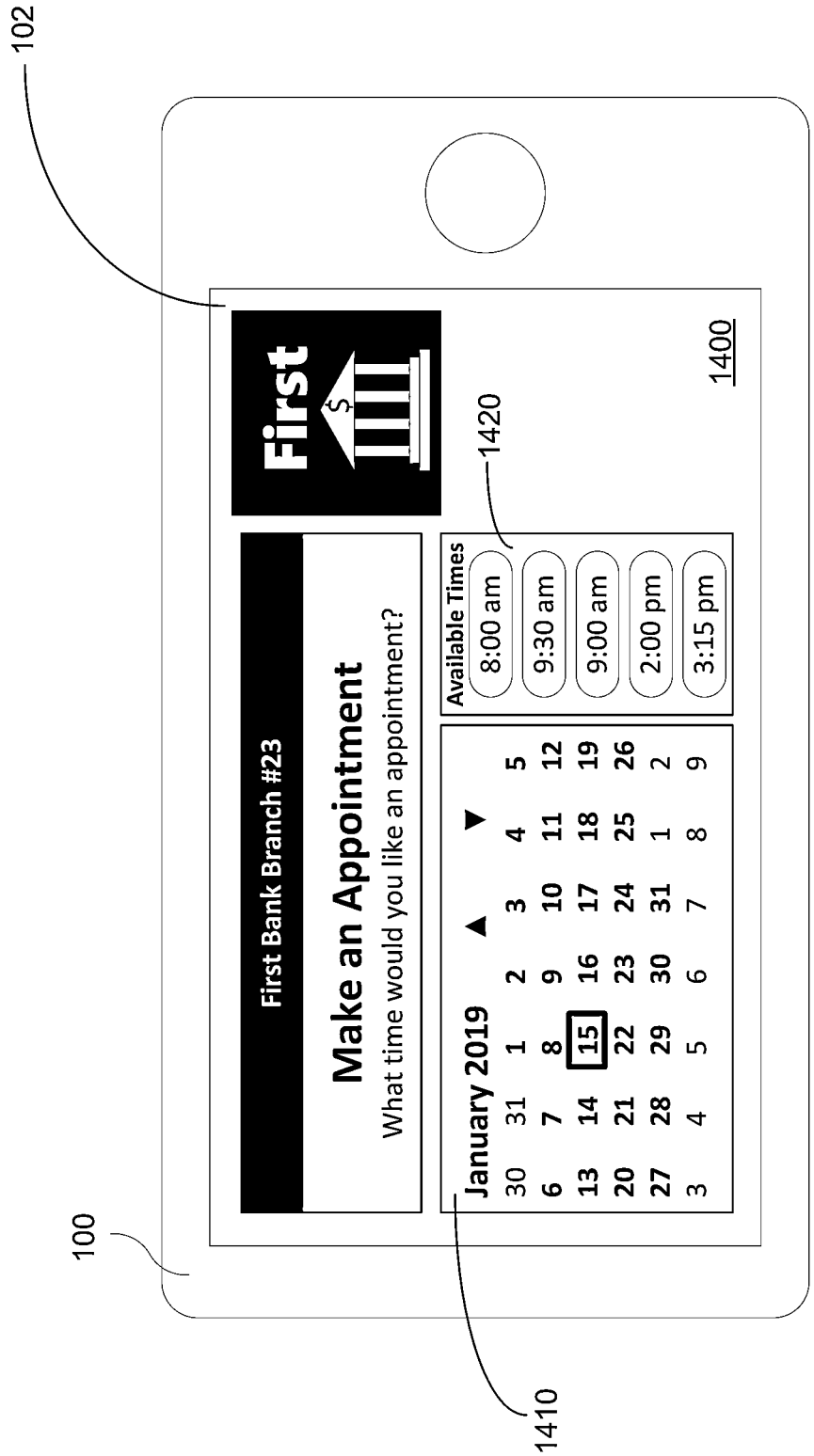
FIG. 14 shows an example user interface for picking a time in scheduling an appointment.

Another example of a user interface as may present information related to scheduling appointments at a physical location is shown in FIG. 14.

As illustrated, a third user interface 1400 includes a date picker user interface control 1410. The date picker user interface control 1410 may be used to select a date for scheduling an appointment. A time picker user interface control 1420 is also included in the third user interface 1400. The time picker user interface control 1420 may provide available times for appointments on the date selected using the date picker user interface control 1410.

In some embodiments, available dates and times for appointments may be received as a part of the information related to scheduling appointments at the particular information received at the operation 708. Alternatively, it may be that only some information (e.g., information about the simple availability of appointments, the types of those appointments, upcoming days/times for appointments available within a defined period) is received at the operation 708 and then the mobile computing device 100 communicates with one or more servers such as, for example, the computer server system 110 (e.g., via the network 120), to receive additional information for presenting additional user interface(s).

As mentioned above, providing an indication based on the information received at the operation 708 may take a variety of forms. In some embodiments, it may be that the information is presented in augmented reality. For example, in embodiments where determining that the mobile computing device 100 is proximate a particular physical location includes capturing an image of a portion of the environment in which the mobile computer device 100 is located, received information may be presented in augmented reality (e.g., an output module such as, for example, the display 102) by overlaying interface elements presenting the information and actions on the captured image such as, for example, over portions of the image corresponding to a particular physical object expected in that physical location such as, for example, a target as was discussed above. These user interface elements may form a user interface providing an indication based on the information received at the operation 708.

Further, it may be that when the mobile computing device 100 is moved relative to the environment, additional images of portions of the environment are captured and the displayed image is updated with the overlaid interface elements being repositioned or even hidden as the overlaid aspects of the image move about or outside the view frame of the captured image—i.e., depending on whether the portions of the target being replaced by/overlaid with interface elements are in or not in the portion of the environment reflected in a given captured image. In this way, an augmented reality interface may be updated to reflect different portions of an environment being featured therein.

Returning to consideration of FIG. 7, following presenting one or more indications based on the received information at the operation 708, an operation 710 is next.

As mentioned above, input may be provided requesting an action in relation to an appointment at the physical location. At the operation 710, such input may be received. For example, it may be that the mobile computing device 100 receives input requesting an action in relation to an appointment at the physical location. The input may be received via an input module such as, for example, the display 102 where the display 102 is a touchscreen.

The requested action may correspond to a variety of operations. For example, the action may request scheduling of an appointment at the physical location. In other words, the requested action could include a request to book one of various available appointments at the physical location. In a particular example, the input may correspond to selection of an available appointment time such as, for example, by way the date picker user interface control 1410 and/or the time picker user interface control 1420 of the third user interface 1400 (FIG. 14). In another example, the input could correspond to a selection of an option to begin scheduling an appointment such as, for example, the selection of an option provided by way of user interface like the user interface element 1240 of the example user interface 1200 (FIG. 12).

In another example, it may be, as mentioned above, that an indication that a prior appointment associated with the mobile computing device 100 was previously scheduled for the physical location is received. The requested action could relate to checking into such an appointment such as, for example, during a permissible check-in interval as discussed above. differently, the input requesting the action may include input selecting an option to check-in for a prior appointment such as, for example the selection of a user interface element like the user interface element 1240 of the example user interface 1200 (FIG. 12). In another example, the requested action could be a request to cancel and/or reschedule such an appointment such as, for example, where in cases where the user is to early and/or too late to check-in as discussed above.

Following receipt of input requesting an action in relation to an appointment at the physical location at the operation 710, an operation 712 is next.

At the operation 712, an indication is sent to initiate the requested action. The indication may be sent by the mobile computing device 100 using the communications module 330. The indication may be sent to the computer server system 110 such as, for example, via the network 120.

The particular nature of details of the indication to initiate the requested action will depend on various factors including the particular action requested at the operation 710. For example, where the requested action was to check-in for a prior appointment, the indication may include a request to check-in for the prior appointment.

Regardless of the nature of the indication, one or more other computer systems may perform operations to advance or carry-out the requested action. For example, where the requested action was an action to check-in for a prior appointment, an indication could be sent to a mobile device associated with one or more persons who are required or intended to attend the appointment. In a particular example, it may be that the indication is sent to the computer server system 110 and that, responsive to receiving the indication, the computer server system 110 sends (or causes to be sent, e.g., via another server) one or more corresponding indications to the one or more persons who are required or intended to attend the appointment.

In another example, where the requested action was to cancel a prior appointment, an indication may be sent requesting cancellation of the appointment. For example, the indication may be an instruction to delete the appointment from a calendar database. Responsive to such an indication a server system, such as, for example, the computer server system 110, may cause the relevant appointment to be deleted from the calendar database.

In another example, where the requested action was to reschedule a prior appointment, an indication requesting rescheduling of the appointment may be sent. For example, it may be that the mobile computing device 100 communicates with a server (e.g., the computer server system 110) in order to identify options for one or more new times for the appointment and then, further to receiving input selecting a new time, to reschedule the appointment to that time (e.g., by scheduling a new appointment and cancelling the prior one).

In yet another example, where the requested action is to make an appointment, an indication requesting the scheduling of an appointment may be sent. The indication may include a request to cause and/or may cause the appointment to be added to the calendar database. For example, it may be that the mobile computing device 100 communicates with a server (e.g., the computer server system 110) in order to cause the appointment to be scheduled. Additionally or alternatively, the sending of a request to one or more other persons with whom the appointment is being scheduled may be triggered. For example, it may be that responsive to receiving the indication requesting the scheduling of an appointment, the computer server system 110 sends (or causes to be sent, e.g., via another server) such requests to the one or more other persons. Responsive to such a request, it may be that that person/those persons can accept the appointment, propose another time, and/or send follow-up questions etc. (e.g., by sending a reply directed to the computer server system 110). In another example, it may be that responsive to the indication requesting the scheduling of an appointment, it is detected, such as, for example, by a server (e.g., the computer server system 110), that the physical location is too busy, such as, for example, at a selected time, to allow an appointment and/or a preferred appointment time is not available. In such scenarios, one or more alternate appointment times may be sent to the mobile computing device 100 for presentation to the user. Additionally or alternatively, one or more alternative appointment locations (e.g., with capacity at the selected time) may be sent to the mobile computing device 100. In a particular example, the one or more alternative locations may be nearby locations such as may be identified as being proximate the physical location.

As mentioned above, beyond display of user interface and receiving of input, some or all of the processing described above may be performed at the mobile computing device, at the computer server system 110, and/or variously between those two computing devices in co-operation. In a particular example, it could be that the mobile computing device 100 is running a web browser (e.g., the application software 410 could be a web browser). The web browser may load one or more pages and/or access one or more scripts received from a server such as, for example, the computer server system 110 (e.g., the application software 610 may be a web server). Such web pages and/or scripts (which could be included in the webpages) may cause a location of the user to be determined (e.g., using the HTML5 getCurrentPosition( ) operation). That location may then be provided by the web browser to a server (e.g., the computer server system 110) which may then use it to identify a physical location corresponding to the current geolocation of the mobile computing device 100. The server may respond with one or more web pages. Those web pages may then be displayed by the mobile computing device 100. The web pages may include interface elements, interaction with which may allow an action in relation to an appointment to be requested. It could for example, be that responsive to interact with such a control, the web browser will be caused (e.g., by a script) to communicate with a server (e.g., via an HTTP POST/GET operation), thereby sending an indication to initiate the requested action.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computing device comprising:
   one or more processors;
   an input module coupled to the one or more processors;
   a communications module coupled to the one or more processors; and
   a memory coupled to the one or more processors and storing instructions that, when executed by the one or more processors, cause the computing device to:
   receive, via the input module, input indicating an instruction to perform an action related to appointments;
   responsive to the input indicating the instruction to perform the action related to appointments, use a plurality of location modules coupled to the one or more processors of the computing device and employing a combination of location determination techniques to avoid or mitigate one or more limitations of a location determination technique in the combination of location determination techniques and to determine that a location of the computing device corresponds to a physical location where appointments are schedulable; and responsive to the determination that the location of the computing device corresponds to the physical location:

receive, via the input module, input indicating a selected time for an appointment for acceptance of at least one or more promotions;

receive, using the communications module, one or more appointment locations alternative to the physical location and with capacity at the selected time and identified based on the physical location;

receive, via the input module, input requesting an action in relation to the appointment at the selected time; and send, using the communications module, an indication to initiate the requested action.

2. The computing device of claim 1, wherein one of the plurality of location modules interacts with a receiver of one or more satellite- based location systems.

3. The computing device of claim 1, wherein one of the plurality of location modules is an image capture module coupled to the one or more processors, and wherein the image capture module is used in the determination that the location of the computing device corresponds to the physical location.

4. The computing device of claim 3, wherein the instructions that cause the computing device to determine that the location of the computing device corresponds to the physical location further cause the computing device to:

capture, using the image capture module, an image of a portion of an environment in which the computing device is located; and detect that the captured image includes a particular physical object expected in the physical location.

5. The computing device of claim 1, wherein the determination that the location of the computing device corresponds to the physical location is based on use of a digital signature encoded in a target corresponding to the physical location to confirm the target is genuine.

6. The computing device of claim 1, wherein the instructions, when executed by the one or more processors, further cause the computing device to, responsive to the determination that the location of the computing device corresponds to the physical location, receive, using the communications module, information related to the one or more promotions.

7. The computing device of claim 1, wherein the instructions, when executed by the one or more processors, further cause the computing device to, responsive to the determination that the location of the computing device corresponds to the physical location, receive, using the communications module, information related scheduling appointments to receive a financial service.

8. The computing device of claim 1, wherein the requested action includes a request to book the appointment at the selected time.

9. The computing device of claim 1, wherein the instructions, when executed by the one or more processors, further cause the computing device to, responsive to the determination that the location of the computing device corresponds to the physical location, present, via an output module, an option to schedule the appointment at a location alternative to the physical location.

10. The computing device of claim 1, wherein the instructions, when executed by the one or more processors, further cause the computing device to use image recognition techniques to recognize features of the physical location.

11. A computer-implemented method comprising:

receiving, at an input module included in a computing device, input indicating an instruction to perform an action related to appointments;

responsive to the input indicating the instruction to perform the action related to appointments, use a plurality of location modules coupled to one or more processors of the computing device and employing a combination of location determination techniques to avoid or mitigate one or more limitations of a location determination technique in the combination of location determination techniques and to determine that a location of the computing device corresponds to a physical location where appointments are schedulable; and responsive to determining that the location of the computing device corresponds to the physical location:

receiving, by the computing device and at the input module, input indicating a selected time for an appointment for acceptance of at least one or more promotions;

receiving, via a network and using a communications module included in the computing device, one or more appointment locations alternative to the physical location and with capacity at the selected time and identified based on the physical location;

receiving, via the input module, input requesting an action in relation to the appointment at the selected time; and sending, using the communications module, an indication to initiate the requested action.

12. The method of claim 11, wherein one of the plurality of location modules interacts with a receiver of one or more satellite-based location systems.

13. The method of claim 11, wherein one of the plurality of location modules is an image capture module included in the computing device and wherein the image capture module is used in determining that the location of the computing device corresponds to the physical location.

14. The method of claim 13, further comprising:

capturing, using the image capture module, an image of a portion of an environment in which the computing device is located; and detecting that the captured image includes a particular physical object expected in the physical location.

15. The method of claim 11, wherein the determination that the location of the computing device corresponds to the physical location is based on use of a digital signature encoded in a target corresponding to the physical location to confirm the target is genuine.

16. The method of claim 11, further comprising, responsive to determining that the location of the computing device corresponds to the physical location, receiving, using the communications module, information related to the one or more promotions.

17. The method of claim 11, further comprising, responsive to determining that the location of the computing device corresponds to the physical location, receiving, using the communications module, information related scheduling appointments to receive a financial service.

18. The method of claim 11, wherein the requested action includes a request to book the appointment at the selected time.

19. The method of claim 11, further comprising using image recognition techniques to recognize features of the physical location.

20. A non-transitory computer-readable storage medium storing instructions that, when executed by one or more processors of a computing device cause the computing device to:
    receive, via an input module of the computing device, input indicating an instruction to perform an action related to appointments;
    responsive to the input indicating the instruction to perform the action related to appointments, use a plurality of location modules coupled to the one or more processors of the computing device and employing a combination of location determination techniques to avoid or mitigate one or more limitations of a location determination technique in the combination of location determination techniques and to determine that a location of the computing device corresponds to a physical location where appointments are schedulable; and
    responsive to the determination that the location of the computing device corresponds to the physical location:
        receive, via the input module, input indicating a selected time for an appointment for acceptance of at least one or more promotions;
        receive, using a communications module of the computing device, one or more appointment locations alternative to the physical location and with capacity at the selected time and identified based on the physical location;
        receive, via the input module, input requesting an action in relation to the appointment at the selected time; and
        send, using the communications module, an indication to initiate the requested action.

\* \* \* \* \*